(12) United States Patent
Zaibel et al.

(10) Patent No.: US 8,320,777 B2
(45) Date of Patent: Nov. 27, 2012

(54) TEMPERATURE CONTROLLED INTERFEROMETER FOR PHASE DEMODULATION

(75) Inventors: Reuven Zaibel, Gan Yavne (IL); Gil Blecher, Petach Tikva (IL)

(73) Assignee: Finisar Corporation, Horsham, PA (US)

(*) Notice: Subject to any disclaimer, the term of this patent is extended or adjusted under 35 U.S.C. 154(b) by 522 days.

(21) Appl. No.: 12/437,549

(22) Filed: May 7, 2009
(Under 37 CFR 1.47)

(65) Prior Publication Data

US 2010/0135677 A1   Jun. 3, 2010

Related U.S. Application Data (60) Provisional application No. 61/051,411, filed on May 8, 2008.

(51) Int. Cl.
*H04B 10/06* (2006.01)
(52) U.S. Cl. ........................................ 398/208; 398/212
(58) Field of Classification Search .................. 359/325, 359/289; 398/202, 208, 212; 356/450, 473
See application file for complete search history.

(56) References Cited

U.S. PATENT DOCUMENTS

| | | | |
|---|---|---|---|
| 6,947,206 B2 | 9/2005 | Tsadka et al. | |
| 7,411,725 B2 | 8/2008 | Suzuki et al. | |
| 2003/0175036 A1 | 9/2003 | Mamyshev et al. | |
| 2003/0175037 A1 | 9/2003 | Kimmitt et al. | |
| 2003/0218790 A1 | 11/2003 | Mikkelsen et al. | |
| 2005/0088659 A1 | 4/2005 | Schlenk et al. | |
| 2006/0072924 A1 | 4/2006 | Lee et al. | |
| 2006/0133712 A1* | 6/2006 | Jang et al. ......................... 385/1 |
| 2007/0196110 A1 | 8/2007 | Mikkelsen et al. | |

FOREIGN PATENT DOCUMENTS

| | | |
|---|---|---|
| EP | 0 967 743 A2 | 12/1999 |
| EP | 1 519 499 A1 | 3/2005 |
| GB | 2 257 319 A | 1/1993 |
| WO | 2007025037 A2 | 3/2007 |

OTHER PUBLICATIONS

Agarwal, A., et al., Experimental Study of Photocurrent Imbalance in a 42.7-Gb/s DPSK Receiver Under Strong Optical Filtering, 2005, pp. 1-3, Optical Society of America.

(Continued)

*Primary Examiner* — Armando Rodriguez
(74) *Attorney, Agent, or Firm* — Kurt Rauschenbach; Rauschenbach Patent Law Group, LLP (57) ABSTRACT

An interferometer includes an optical beam splitter that splits an input optical signal into a first optical signal propagating in a first optical path comprising free space and a second optical signal propagating in a second optical path comprising a dielectric medium. A differential delay delays the second optical signal relative to the first optical signal by a differential delay time that is proportional to at least one of a temperature and a refractive index of the dielectric medium. A temperature controller in thermal contact with the dielectric medium changes the temperature of the dielectric medium to control at least one of thermal expansion/contraction and a temperature dependent change in the refractive index of the dielectric medium, thereby changing the differential phase delay. An optical beam splitter/combiner optically coupled to the first and second optical paths generates a first and second interferometric optical signal having an amplitude and phase that is related to the differential delay.

13 Claims, 5 Drawing Sheets

OTHER PUBLICATIONS

Bosco, G., et al., The Impact of Receiver Imperfections on the Performance of Optical Direct-Detection DPSK Journal of Lightwave Technology, Feb. 2005, pp. 842-848, vol. 23, No. 2.

Gnauck, A.H., et al., 2.5 Tb/s (64X42.7 Gb/s) Transmission Over 40X100 km NZKSF Using RZ-DPSK Format and All-Raman-Amplified Spans, 2002, pp. FC2-1-FC2-3, Optical Society of America.

Humblet, et al., On the Bit Error Rate of Lightwave Systems With Optical Amplifies, Journal of Lightwave Technology, Nov. 1991, pp. 1576-1582, vol. 9, No. 11.

Hsieh, et al., A Thermal Demodulator for 42.7-Gb/s DPSK Signals.

Lyubomirsky, et al., DPSK Demodulator Based on Optical Discriminator Filter, IEEE Photonics Technology Letters, Feb. 2005, pp. 492-494, vol. 17, No. 2.

Yoskikane, Noboru, et al., Benefit of Half-Bit Delay Demodulation for Severely Bandlimited RZ-DPSK Signal, KKDI R & D Laboratories, Japan.

Gnauck, et al., Optical Phase-Shift-Keyed Transmission, IEEE Journal of Lightwave Technology, vol. 23, pp. 115-130, 2005.

Lyubomirsky, et al., Impact of Optical Filtering on Duobinary Transmission, IEEE Photon, Technol. Lett 16, 1969 (2004).

Malouin, Differential Phase-Shift Keying Receiver Design Applied to Strong Optical Filtering, IEEE, Journal of Lightwave Technology, vol. 25, pp. 3536-3542, 2007.

Malouin, et al., DPSK Receiver Design-Optical Filtering Considerations, OFC 2007 OTHK 1.

Mikkelsen, et al., Partial DPSK With Excellent Filter Tolerance and OSNR Sensitivity, Electronics Letters, vol. 42, pp. 1363-1365, 2006.

Winzer, et al., Degradations in Balanced DPSK Receivers, IEEE Photonics Technology Letters, vol. 15, No. 9, Sep. 2003.

* cited by examiner

TEMPERATURE CONTROLLED INTERFEROMETER FOR PHASE DEMODULATION

CROSS-REFERENCE TO RELATED APPLICATIONS

The present application is a non-provisional of U.S. Provisional Patent Application Ser. No. 61/051,411 filed on May 8, 2008. The entire contents U.S. Patent Application Ser. No. 61/051,411 is herein incorporated by reference.

The section headings used herein are for organizational purposes only and should not to be construed as limiting the subject matter described in the present application.

BACKGROUND OF THE TEACHING

Currently, many DWDM optical fiber transmission systems operate at 10 Gb/s channel rates. DWDM optical fiber transmission systems operating at channel rates of 40 Gb/s and higher are highly desirable because they potentially have greater optical fiber capacity and also have lower cost per transmitted bit compared to 10 Gb/s and lower channel rate transmission systems. The need for high bit-rate data transmissions of 40 Gb/s or more through optical fibers presents significant technical challenges to the fiber-optic telecommunications industry because such high bit-rate systems are highly susceptible to optical fiber nonlinearities.

The modulation format of 40 Gb/s DWDM transmission systems must be chosen to have high Optical Signal-to-Noise Ratio (OSNR) sensitivity. High OSNR sensitivity means that a low OSNR signal is sufficient to maintain a desired bit error rate (BER) of the transmission or, equivalently, that the system is able to operate at a desired BER even in the presence of a high level of optical noise. In addition, modulation formats of 40 Gb/s DWDM transmission systems must be chosen to be tolerant to optical filtering because existing systems sometimes include optical multiplexers and demultiplexers for 50 GHz channels spacing that limit the bandwidth. Also, modulation formats of 40 Gb/s DWDM transmission systems must be chosen to be tolerant to cascaded optical add-drop multiplexers.

The Differential-Phase Shift Keying (DPSK) modulation format, which is sometimes referred to as Differential Binary Phased Shift Keying (DBPSK), has been considered for use in 40 Gb/s DWDM transmission systems. Using the DPSK modulation format has numerous advantages over the more conventional On-Off Keying (OOK) modulation format that is deployed in many relatively low data rate transmission systems. Differential-Phase Shift Keying transmission systems have been shown to have an approximately 3 dB improvement of OSNR sensitivity compared to OOK transmission systems. However, the DPSK modulation format is more complicated to transmit and receive than the more conventional OOK modulation format.

The Differential Quadrature Phased Shift Keying (DQPSK) modulation format has also been considered for 40 Gb/s DWDM transmission systems. The DQPSK modulation format uses a symbol rate that is one half of the data rate. For example, a 43 Gb/s data rate in a DQPSK system corresponds to a data rate of 21.5 Giga symbols per second. Consequently, DQPSK transmission systems have a narrower spectral bandwidth, greater chromatic dispersion tolerance, and greater tolerance with respect to polarization mode dispersion (PMD) compared with OOK and DPSK modulation formats. However, DQPSK transmission systems have worse receiver sensitivity than DPSK transmission systems. Also DQPSK transmitters and receivers are significantly more complex than OOK and DPSK transmitters and receivers.

Both DPSK and DQPSK modulation formats are used in a non-return-to-zero (NRZ) format where the light intensity is constant between two neighboring symbols and a return-to-zero (RZ) format where the light intensity always drop or return to zero between each symbol. The light intensity returns to zero even if the data signal includes numerous consecutive zeros or ones. Transmitters using RZ-type modulation formats can achieve better OSNR receiver sensitivity and tolerance to fiber nonlinearities than transmitters using NRZ-type modulation formats.

In DPSK and DQPSK transmission systems, the digital information is written in the optical phase of the signal and, therefore, the digital information cannot be detected by ordinary intensity detectors. Differential-Phase Shift Keying receivers use optical demodulators to convert the phase modulated signal to an amplitude modulated signal that can be detected by ordinary intensity detectors.

Both DPSK and DQPSK receivers use one or more optical demodulators that convert the phase modulation of the transmitted optical signal into amplitude modulated signals that can be detected with direct detection receivers. Typically, optical demodulators are implemented as delay interferometers that split the optical signal into two parts, delay one part relative to the other part of the optical signal by a differential delay $\Delta t$, and then recombine the two parts of the optical signal to achieve constructive or destructive interference depending on the phase which is modulated onto the optical signal by the transmitter.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DETAILED DESCRIPTION

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

The present teaching relates to a temperature controlled interferometer generally. Although many embodiments of the present teaching are described in connection with phase demodulation, it should be understood that the temperature controlled interferometer of the present teaching can be used for numerous other applications including any application that uses interferometers.

Figure 1:
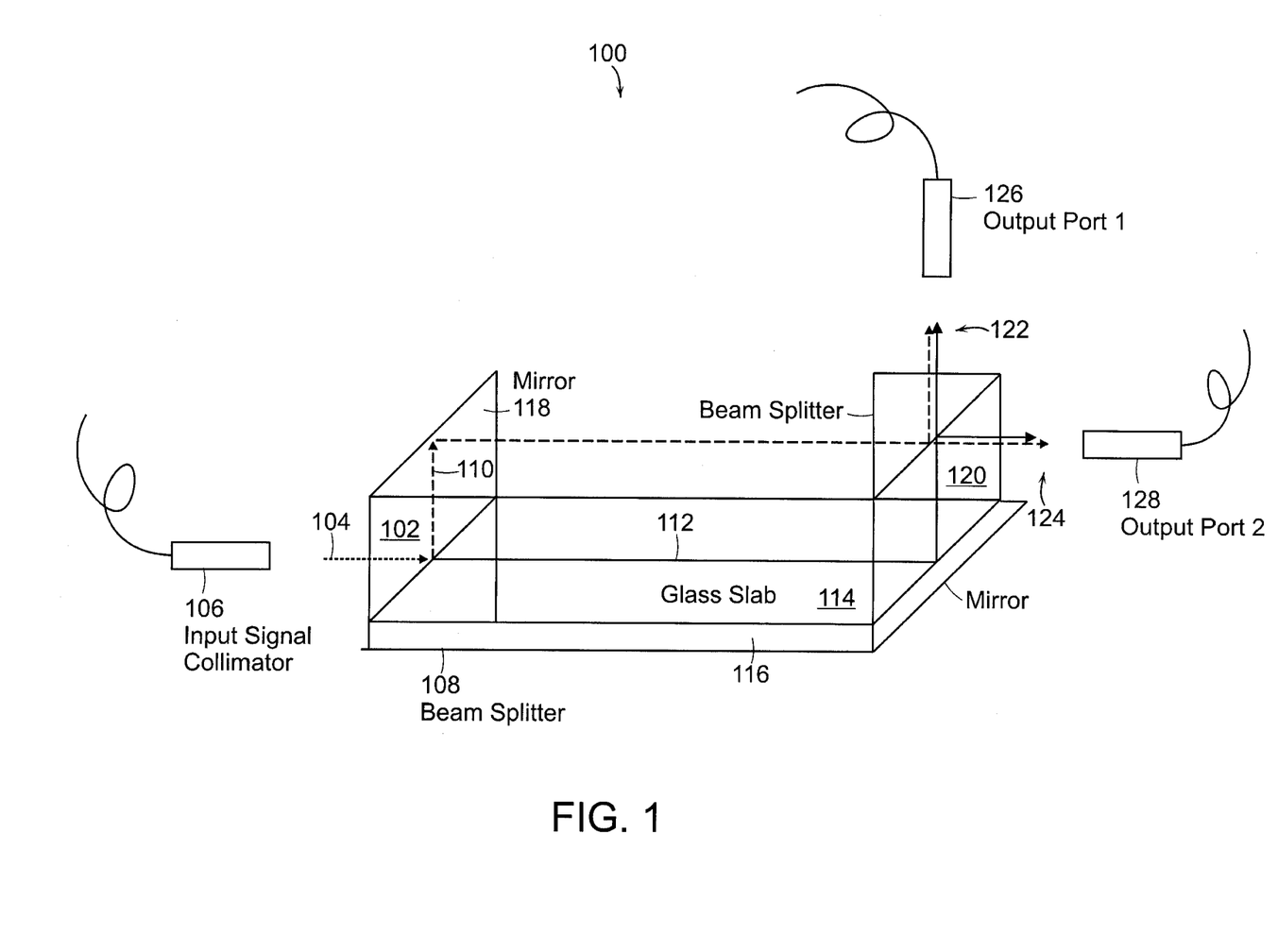
FIG. 1 illustrates one embodiment of a temperature controlled interferometer according to the present teaching that includes a dielectric material in one arm of the interferometer.

FIG. 1 illustrates one embodiment of a temperature controlled interferometer 100 according to the present teaching that includes a dielectric material in one arm of the interferometer. The interferometer 100 is an unbalanced Mach Zehnder type interferometer. The interferometer 100 includes an optical input 102 that receives an input optical signal along an input signal path 104. In some embodiments, a collimator 106 is used to narrow the spatial cross-section of the input optical signal so that it has the desired beam width.

An optical beam splitter 108 splits the collimated input optical signal into a first optical signal that propagates in a first optical path 110 and a second optical signal that propagates in a second optical path 112. In the embodiment shown in FIG. 1, the first optical path 110 is a free space optical path and the second optical path 112 propagates through a dielectric medium 114. One skilled in the art will appreciate that many different types of dielectric medium can be used with the interferometer 100. For example, the dielectric medium 114 can be a glass or sapphire slab.

A temperature controller 116 is in thermal contact with the dielectric medium 114. The temperature controller 116 changes the temperature of the dielectric medium 114 to control both the thermal expansion/contraction of the dielectric medium 114 and the temperature dependent change in the refractive index of the dielectric medium 114.

The interferometer 100 also includes a mirror 118 in the first optical path 110 that redirects the first optical path 110 through the interferometer 100. In addition, the interferometer 100 includes an optical beam splitter/combiner 120. The mirror 118 directs the first optical path 110 to a first input of the beam splitter/combiner 120. The beam splitter 108 directs the second optical path 112 to a second input of the optical beam splitter/combiner 120.

A first output 122 of the optical beam splitter/combiner 120 generates a first interferometric optical signal having an amplitude and phase that is related to the differential delay provided by the dielectric media 114 having a temperature that is controlled by the temperature controller 116. A second output 124 of the optical beam splitter/combiner 120 generates a second interferometric optical signal having an amplitude and phase that is related to the differential phase delay provided by the dielectric media 114 having a temperature that is controlled by the temperature controller 116. A first optical detector 126 detects the optical signal propagating from the first output 122. A second optical detector 128 detects the optical signal propagating from the second output 124. In one embodiment, one of the first and the second interferometric signals is a constructive interference signal and the other of the first and the second interferometric signals is a destructive interference signal.

In one embodiment, the optical properties of the dielectric medium 114 are chosen so that the differential phase delay between the first and second optical paths 110, 112 is approximately equal to a $\pm\pi$ or $\pm\pi/4$ phase delay. For example, the length of the dielectric media 114 can be chosen so that the differential phase delay is approximately equal to a $\pm\pi$ or $\pm\pi/4$ phase delay for a particular refractive index of the dielectric material and a desired operating temperature. Also, the refractive index of the dielectric media 114 can be chosen so that the differential phase delay is approximately equal to a $\pm\pi$ or $\pm\pi/4$ phase delay for a particular length of the dielectric material 114 and a desired operating temperature. In addition, the temperature of the dielectric medium 114 can be chosen so that the differential phase delay is approximately equal to a $\pm\pi$ or $\pm\pi/4$ phase delay for a particular length and refractive index of dielectric medium 114. In fact, any combination of the length of the dielectric media 114, the refractive index of the dielectric media 114, and the temperature of the dielectric medium 114 can be chosen so that the differential phase delay is approximately equal to a $\pm\pi$ or $\pm\pi/4$ phase delay.

In operation, an input optical signal is collimated by the collimator 106 and then received at the optical input 102 of the interferometer 100. The collimated optical signal is then split into a first optical signal that propagates in the first optical signal path 110 and a second optical signal that propagates in the second optical path 112. The first optical signal path 110 is a free space optical path. The second optical signal path 112 propagates through the dielectric medium 114. The dielectric medium 114 delays the second optical signal relative to the first optical signal by a differential phase delay. The differential phase delay is determined by properties, such as the length of the dielectric medium 114, the temperature of the dielectric medium 114, and the refractive index of the dielectric medium 114.

The optical beam splitter/combiner 120 generates a first interferometric optical signal at the first output 122 having an amplitude and phase that is related to the differential delay provided by the dielectric medium 114 having a temperature that is controlled by the temperature controller 120. The splitter/combiner 120 generates a second interferometric optical signal at the second output 124 having an amplitude and phase that is also related to the differential phase delay provided by the temperature controller 116. In one mode of operation, the first interferometric signal comprises a constructive interference signal and the second interferometric signal comprises a destructive interference signal.

The temperature controller 116 is used to change the differential phase delay in the second optical signal path 112 relative to the first optical signal path 110 to a desired phase delay that achieves the desired first and second interferometric signals. The temperature controller 116 changes the temperature of the dielectric medium 114 to control at least one of the thermal expansion/contraction and the temperature dependent change in the refractive index of the dielectric medium 114.

In some embodiments, the temperature dependent change in the refractive index of the dielectric medium 114 is proportional to the temperature of the dielectric medium 114. For example, the refractive index of some dielectric materials like BK7 glass increases with temperature so that both the thermal expansion and the refractive index increase with temperature. In other embodiments, the temperature dependent change in the refractive index is inversely proportional to the temperature of the dielectric medium 114 so that the refractive index decreases with temperature while the thermal expansion increases with temperature. Changing one or both of the thermal expansion/contraction and the temperature dependent change in the refractive index changes the differential phase delay in the second optical signal path 112 relative to the first optical signal path 110 and, therefore, changes the first and second interferometric signals.

Therefore, one feature of the temperature controlled interferometer of the present teaching is that the relative phase between the first and second optical paths of the interferometer can be controlled by adjusting a single temperature with a temperature controller. There are no moving parts. Therefore, interferometers according to the present teaching can have very high reliability. Most of the structure of the interferometer can be free space optics. In addition, a temperature controlled interferometer according to the present teaching can be fabricated from a single piece of glass. Therefore, interferometers according to the present teaching can be relatively simple and inexpensive to construct. One skilled in the art will appreciate that there are many variations of the temperature controlled interferometer according to the present teaching.

Figure 2:
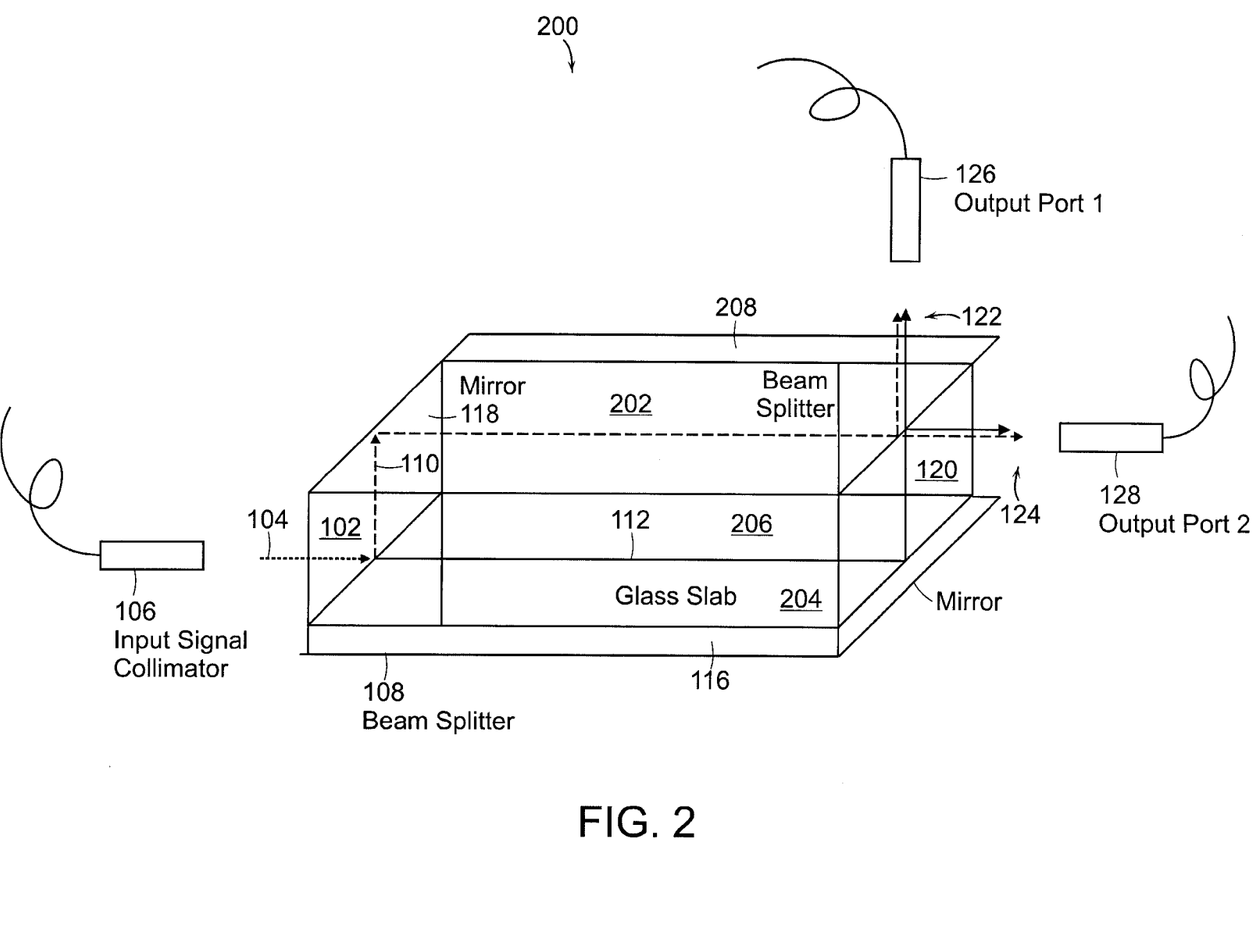
FIG. 2 illustrates another embodiment of a temperature controlled interferometer according to the present teaching that includes a first dielectric material in the first optical path of the interferometer and a second dielectric material in the second optical path of the interferometer.

FIG. 2 illustrates another embodiment of a temperature controlled interferometer 200 according to the present teaching that includes a first dielectric material 202 in the first optical path 110 of the interferometer 200 and a second dielectric material 204 in the second optical path 112 of the interferometer 200. The interferometer 200 is similar to the interferometer 100 described in connection with FIG. 1 except that the first optical path 110 includes the first dielectric material 202, which is not free space.

The optical beam splitter 108 splits the collimated input optical signal into a first optical signal that propagates in the first optical path 110 through the first dielectric medium 202 and into a second optical signal that propagates in the second optical path 112 through the second dielectric medium 204. One skilled in the art will appreciate that many different types of dielectric media can be used for the first and second dielectric media 202, 204.

A temperature controller 116 is in thermal contact with the second dielectric medium 204. The temperature controller 116 changes the temperature of the second dielectric medium 204 relative to the temperature of the first dielectric media 202 to control both the thermal expansion/contraction of the second dielectric medium 204 and the temperature dependent change in the refractive index of the second dielectric medium 204 as described in connection with FIG. 1. In one embodiment, a thermal barrier 206 is positioned between the first and second dielectric media 202, 204 in order to thermally isolate the first dielectric media 202 from the second dielectric media 204.

In one embodiment, a second temperature controller 208 is used to control the temperature of the first dielectric medium 202. In many embodiments, the first and second temperature controllers 116, 208 can independently control the temperature of the first and second dielectric media 202, 204.

As described in connection with the interferometer of FIG. 1, in some embodiments, the temperature dependent change in the refractive index of the first and second dielectric media 202, 204 is proportional to the temperature of the dielectric medium. In these embodiments, both the thermal expansion and the refractive index increase with temperature. In other embodiments, the temperature dependent change in the refractive index of the first and second dielectric media 202, 204 is inversely proportional to the temperature of the dielectric medium. In these embodiments, the refractive index decreases with temperature while the thermal expansion increase with temperature.

A first output 122 of the optical beam splitter/combiner 120 generates a first interferometric optical signal having an amplitude and phase that is related to the differential delay provided by the first and second dielectric media 202, 204 having temperatures controlled by their respective temperature controllers 208, 116. A second output of the optical beam splitter/combiner 120 generates a second interferometric optical signal having an amplitude and phase that is related to the differential phase delay provided by the first and second dielectric media 202, 204 having temperatures controlled by their respective temperature controllers 116, 208. In one embodiment, one of the first and the second interferometric signals is a constructive interference signal and the other of the first and the second interferometric signals is a destructive interference signal.

In one embodiment, the optical properties of the first and second dielectric mediums 202, 204 are chosen so that the differential phase delay between the first and second optical paths 110, 112 is approximately equal to a $\pm\pi$ or $\pm\pi/4$ phase delay. For example, the length of the first and second dielectric media 202, 204 can be chosen so that the differential phase delay is approximately equal to a $\pm\pi$ or $\pm\pi/4$ phase delay for the particular refractive indexes and the desired operating temperatures of the first and second dielectric media 202, 204. Also, the refractive indexes of the first and second dielectric media 202, 204 can be chosen so that the differential phase delay is approximately equal to a $\pm\pi$ or $\pm\pi/4$ phase delay for the particular lengths of the first and second dielectric media 202, 204 and the desired operating temperatures. In addition, the temperature of the dielectric media 202, 204 can be chosen so that the differential phase delay is approximately equal to a $\pm\pi$ or $\pm\pi/4$ phase delay for the particular lengths and refractive indexes of first and second dielectric media 202, 204.

Figure 3:
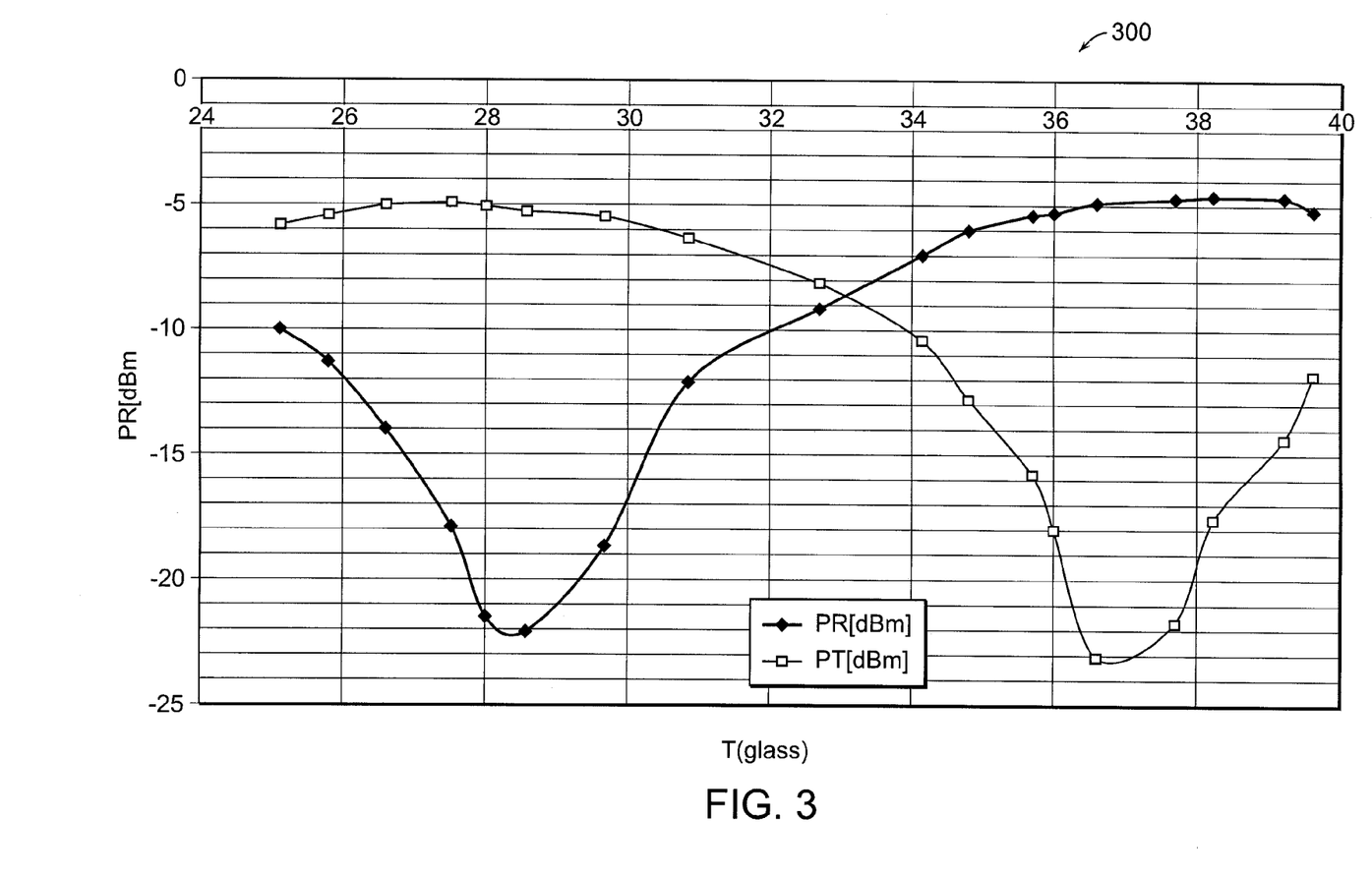
FIG. 3 presents data obtained with the temperature controlled interferometer described in connection with FIG. 1 that includes a dielectric material in one arm of the interferometer.

FIG. 3 presents data 300 taken with the temperature controlled interferometer described in connection with FIG. 1 that includes a dielectric material 116 in one arm of the interferometer 100 and free space in the other arm of the interferometer 100. Data was obtained with a 1550 nm input optical signal. The data 300 are presented in the form of relative intensity of the first 122 and the second output 124 of the optical beam splitter/combiner 120 as a function of temperature. The data indicate that a $\pi$ phase change can be obtained by scanning the temperature by about eight degrees C.

Therefore, the data suggest that changing the temperature of the dielectric medium 116 by only eight degrees C. will provide the desired $\pi$ phase shift necessary for demodulation and many other applications. It is relatively easy to scan or to set-and-hold the temperature of the dielectric medium 116 through an eight degrees C. temperature range with commercially available temperature controllers. Furthermore, it is relatively easy to scan or to set-and-hold the relative temperature difference between the first and second dielectric media 202, 204 through an eight degrees C. temperature range with commercially available temperature controllers.

Figure 4:
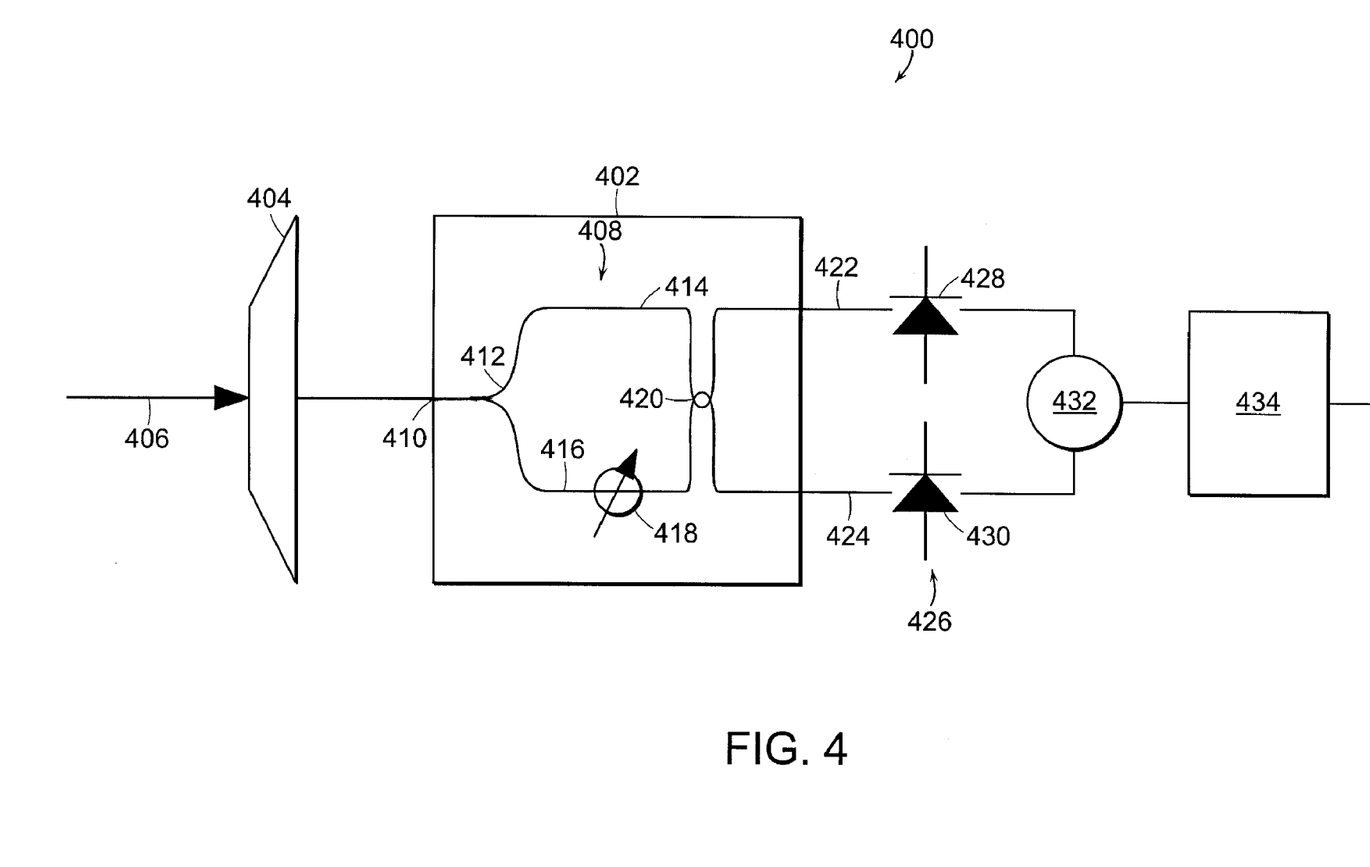
FIG. 4 illustrates a block diagram of a DPSK/DQPSK optical receiver that includes a demodulator with a temperature controlled interferometer according to the present teaching.

FIG. 4 illustrates a block diagram of a DPSK/DQPSK optical receiver 400 that includes a demodulator 402. Referring to both FIGS. 1 and 4, the optical receiver 400 includes a demultiplexer 404 having an input that is optically coupled to an optical transmission line 406 that propagates a plurality of optical channels. Numerous types of optical demultiplexers can be used to generate a demultiplexed optical signal that includes a plurality of optical signals.

The demodulator 402 includes a temperature controlled unbalanced Mach Zehnder interferometer 408, such as the interferometers 100, 200 shown in connection with FIGS. 1 and 2. The interferometer 408 can be built from commercially available interferometers, such as interferometers manufactured by Optoplex. The output of the demultiplexer 404 is optically coupled to the input signal path 410 of the interferometer 408. In some embodiments, a collimator 106 (FIG. 1) is used to narrow the spatial cross-section of the demultiplexed optical signal so that it has the desired beam width.

The interferometer 408 includes an optical beam splitter 412 that splits the demultiplexed optical signal into a first optical signal that propagates in a first optical path 414 and a second optical signal that propagates in a second optical path 416. The first optical path 114 can be a free space optical path or can be an optical path that includes a dielectric medium. The second optical path 414 includes a dielectric medium that is different from free space or is different from the dielectric medium in the first optical path.

A temperature controller 418 is in thermal contact with the dielectric medium in the second optical path 416. The temperature controller 418 is positioned and designed to change the temperature of the dielectric medium in the second optical path to control both the thermal expansion/contraction and the temperature dependent change in the refractive index of the dielectric medium.

An optical beam splitter/combiner 420 combines the first and second optical paths 414, 416 and generates a first interferometric optical signal at a first output 422 and a second interferometric optical signal at a second output 424. A balanced detector 426 detects the first and second interferometric optical signals. The first output 422 of the interferometer 408 is optically coupled to an input of a first optical detector 428. The second output 424 of the interferometer 402 is optically coupled to an input of a second optical detector 430. The first and second optical detectors 428, 430 can be any type optical detector, such as a photodiode.

An electrical signal combiner 432 includes a first and a second electrical input. An output of the first optical detector 428 is electrically coupled to a first input of the combiner 432. An output of the second optical detector 430 is electrically coupled to a second input of the combiner 432. The electrical signal combiner 432 generates an electrical demodulation signal at an output. An electronic receiver 434 processes the electrical demodulation signal.

In operation, the demultiplexer 404 generates a demultiplexed optical signal that includes a plurality of optical signals, where each optical signal has a different wavelength. In one embodiment, the plurality of optical signals comprises a plurality of DPSK signals where the payload data is encrypted in the optical phase. The demultiplexed optical signal is coupled into the interferometer 408. In some embodiments, the demultiplexed optical signal is collimated. The optical beam splitter 412 splits the demultiplexed optical signal into a first optical signal that propagates in a first optical path 414 and a second optical signal that propagates in a second optical path 416. The temperature controller 418 changes the temperature of the dielectric medium in the second optical path to control both the thermal expansion/contraction and the temperature dependent change in the refractive index of the dielectric medium.

The optical beam splitter/combiner 420 combines the first and second optical paths 414, 416 and generates a first interferometric optical signal at a first output 422 and a second interferometric optical signal at a second output 424. The first and second interferometric optical signals have amplitudes and phases that are related to the differential delay provided by the dielectric media in the second optical path 416 having a temperature that is controlled by the temperature controller 418. That is, the dielectric medium in the second optical path delays the second optical signal relative to the first optical signal by a differential phase delay.

The differential phase delay is determined by properties, such as the length of the dielectric medium, the temperature of the dielectric medium, and the refractive index of the dielectric medium in the second optical path 416. In one embodiment, the interferometer applies a π phase shift to the optical signal propagating in the second optical path 416 relative to the optical signal propagating in the first optical path 414. In this embodiment, the optical signals traveling in the first and second optical paths 414, 418 constructively and destructively interfere.

The first optical detector 428 detects the optical signal propagating from the first output 422 of the interferometer 408 and generates a first electrical detection signal. The second optical detector 430 detects the optical signal propagating from the second output 424 of the interferometer 408 and generates a second electrical detection signal.

The electrical signal combiner 432 combines the first and second electrical detection signals that are generated by respective ones of the first and second optical detectors 428, 430 and generates a resulting electrical demodulation signal. The electronic receiver 434 processes the electrical demodulation signal to obtain the modulated payload data.

Figure 5:
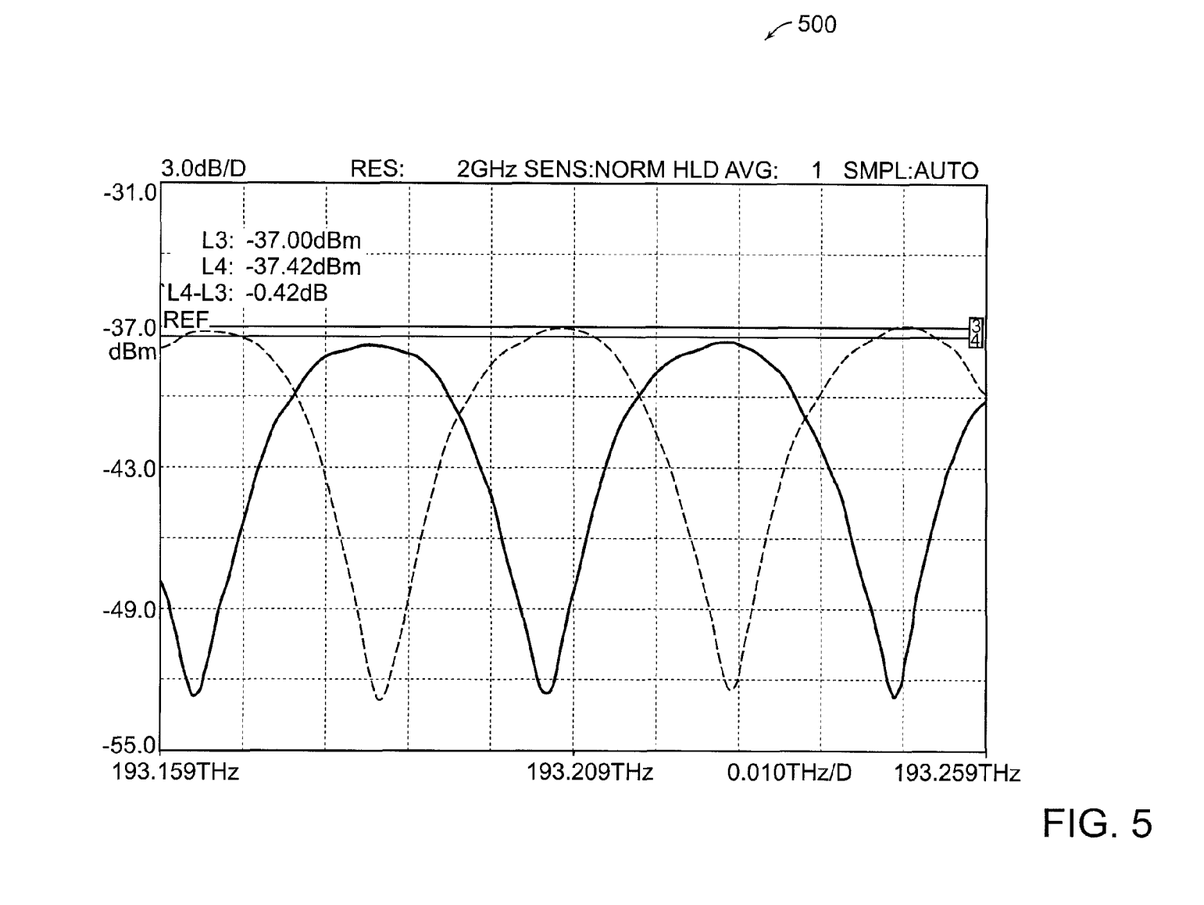
FIG. 5 illustrates a measured spectrum of demodulated data obtained from a demodulator that includes an interferometer according to the present teaching.

FIG. 5 illustrates a measured spectrum of demodulated data 500 obtained from a demodulator that includes an interferometer according to the present teaching. Referring to FIG. 4, a signal from a white light source, such as an EDFA, that emits amplified stimulated emission is applied to the input signal path 410 of the interferometer 408. The demodulated data 500 was measured at the first and second outputs 422, 424 of the interferometer 408. The interferometer 408 was designed to have a free spectral range equal to 42.8 GHz.

The demodulated data 500 in FIG. 5 show the expected constructive and destructive interference at the first and second outputs 422, 424 of the interferometer 408. Also, the demodulated data 500 indicate that the free spectral range of the interferometer is 42.5 GHz, which is very close to the 42.8 GHz free spectral range that the interferometer was designed to achieve.

EQUIVALENTS

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, may be made therein without departing from the spirit and scope of the teaching.

What is claimed is:

1. A demodulator comprising:
   a. an optical beam splitter that splits a phase modulated optical signal into a first phase modulated optical signal propagating in a first optical path comprising free space and a second phase modulated optical signal propagating in a second optical path comprising a dielectric medium, the second phase modulated optical signal being delayed relative to the first phase modulated optical signal by a differential delay time that is proportional to at least one of a temperature and a refractive index of the dielectric medium;
   b. a temperature controller that is in thermal contact with the dielectric medium, the temperature controller changing a temperature of the dielectric medium to control at least one of a thermal expansion/contraction and a temperature dependent change in the refractive index of the dielectric medium, thereby changing the differential phase delay; and
   c. an optical beam splitter/combiner having a first input that is optically coupled to an output of the first optical path and a second input that is optically coupled to an output of the second optical path, a constructive output of the optical beam splitter/combiner generating a first demodulated optical signal and a destructive interference optical signal generating a second demodulated optical signal.

2. The demodulator of claim 1 wherein the phase modulated optical signal comprises at least one of a RZ-type and a NRZ-type modulation signal.

3. The demodulator of claim 1 wherein the differential delay is less than or equal to one bit period of the phase modulated optical signal.

4. The demodulator of claim 1 wherein the differential delay is chosen to improve at least one of signal-to-noise ratio, bit error rate, and dispersion tolerance of the first and second demodulated optical signals.

5. The demodulator of claim 1 wherein the differential delay is chosen to optimize at least one of signal-to-noise ratio, bit error rate, and dispersion tolerance of the first and second demodulated optical signals.

6. The demodulator of claim 1 wherein the temperature controller controls the temperature of the dielectric medium to change both the thermal expansion/contraction and the temperature dependent change in the refractive index of the dielectric medium.

7. A method of demodulating a phase modulated optical signal, the method comprising:
   a. receiving a phase modulated optical signal;
   b. splitting the phase modulated optical signal into a first phase modulated optical signal propagating in a first optical path comprising free space and a second phase modulated optical signal propagating in a second optical path comprising a dielectric medium;
   c. delaying the second phase modulated optical signal relative to the first phase modulated optical signal by a differential delay time which is determined by at least one of a temperature and a refractive index of the dielectric medium; and
   d. combining an output of the first optical path and an output of the second optical path, thereby generating a first demodulated optical signal and a second demodulated optical signal.

8. The method of claim 7 wherein the phase modulated optical signal comprises one of a DPSK and a DQPSK modulated optical signal.

9. The method of claim 7 wherein the differential delay is approximately equal to less than or equal to one bit period of the phase modulated optical signal.

10. The method of claim 7 wherein the differential delay is adjusted so that the first and second demodulated optical signals have an ITU channel spacing.

11. The method of claim 7 further comprising scanning the temperature of the dielectric medium to improve at least one of signal-to-noise ratio, bit error rate, and dispersion tolerance of the first and second demodulated optical signals.

12. The method of claim 7 further comprising scanning the temperature of the dielectric medium to optimize at least one of signal-to-noise ratio, bit error rate, and dispersion tolerance of the first and second demodulated optical signals.

13. A demodulator comprising:
   a. an optical beam splitter that splits a phase modulated optical signal into a first phase modulated optical signal propagating in a first optical path and a second phase modulated optical signal propagating in a second optical path comprising a dielectric medium, the second phase modulated optical signal being delayed relative to the first phase modulated optical signal by a differential delay time that is proportional to at least one of a temperature and a refractive index of the dielectric medium;
   b. a temperature controller that is in thermal contact with the dielectric medium, the temperature controller changing a temperature of the dielectric medium to control both the thermal expansion/contraction and the temperature dependent change in the refractive index of the dielectric medium to change both the thermal expansion/contraction and the temperature dependent change in the refractive index of the dielectric medium; and
   c. an optical beam splitter/combiner having a first input that is optically coupled to an output of the first optical path and a second input that is optically coupled to an output of the second optical path, a constructive output of the optical beam splitter/combiner generating a first demodulated optical signal and a destructive interference optical signal generating a second demodulated optical signal.

* * * * *